United States Patent
Hsiao

(10) Patent No.: US 8,695,629 B2
(45) Date of Patent: Apr. 15, 2014

(54) MANUALLY OPERABLE GAS REGULATOR

(76) Inventor: Cheng-Sheng Hsiao, Chia-Yi (TW)

( * ) Notice: Subject to any disclaimer, the term of this patent is extended or adjusted under 35 U.S.C. 154(b) by 293 days.

(21) Appl. No.: 13/315,605

(22) Filed: Dec. 9, 2011

(65) Prior Publication Data
US 2013/0146157 A1   Jun. 13, 2013

(51) Int. Cl.
   *F16K 31/14*   (2006.01)
(52) U.S. Cl.
   USPC ............... 137/495; 137/505.36; 137/505.46; 137/505.47
(58) Field of Classification Search
   USPC .......... 137/495, 505, 505.22, 505.36, 505.46, 137/505.47, 524, 530
   See application file for complete search history.

(56) References Cited

U.S. PATENT DOCUMENTS

| | | | | |
|---|---|---|---|---|
| 1,015,975 A | * | 1/1912 | Pickering | 137/251.1 |
| 1,524,768 A | * | 2/1925 | Walters | 137/465 |
| 2,219,441 A | * | 10/1940 | Carnes | 137/505.46 |
| 2,592,259 A | * | 4/1952 | Eddy et al. | 137/113 |
| 2,694,410 A | * | 11/1954 | Ey | 137/505.46 |
| 5,735,306 A | * | 4/1998 | Olds et al. | 137/116.5 |
| 5,735,309 A | * | 4/1998 | Kariniemi et al. | 137/505.46 |
| 5,771,921 A | * | 6/1998 | Johnson | 137/505 |
| 6,308,730 B1 | * | 10/2001 | Schulze | 137/495 |
| 6,431,205 B1 | * | 8/2002 | Bartos | 137/505.46 |
| 7,219,689 B2 | * | 5/2007 | Pollock et al. | 137/505.46 |
| 7,810,517 B2 | * | 10/2010 | Chang et al. | 137/505.18 |

* cited by examiner

Primary Examiner — Eric Keasel
Assistant Examiner — Jessica Cahill
(74) Attorney, Agent, or Firm — Symbus Law Group LLC; Clifford D. Hyra

(57) ABSTRACT

A manually operable gas regulator includes a knob, an upper cover, a return spring, a movable block, a pressure adjusting spring, a diaphragm assembly, a body, and a lever pivotably mounted to the body. An upper end of the diaphragm assembly abuts a lower end of the pressure adjusting spring whose upper end abuts a lower end of the movable block. An upper end of the movable block abuts a lower end of the movable block securely engaged with the upper cover and the knob. Rotation of the knob causes upward/downward movement of an axle of the diaphragm assembly to pivot the lever. A plug on an end of the lever is moved to accurately control the flow of gas and to accurately close or open an output end of an inlet passage of the body.

1 Claim, 4 Drawing Sheets

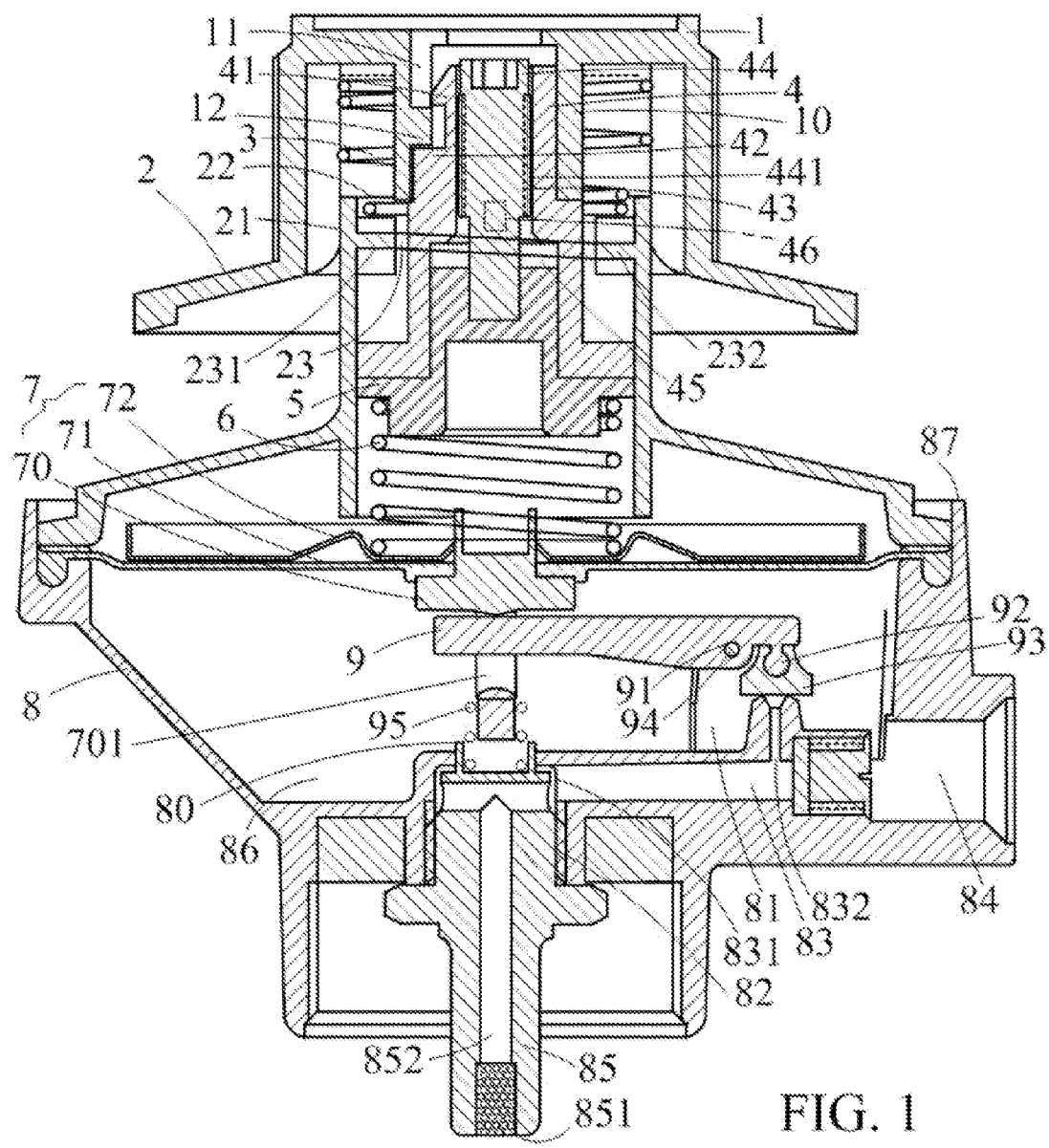
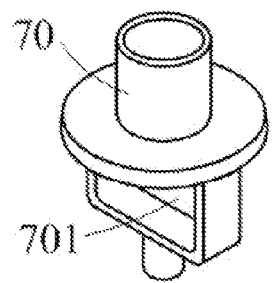
FIG. 1
FIG. 2

MANUALLY OPERABLE GAS REGULATOR

BACKGROUND OF THE INVENTION

The present invention relates to a gas regulator and, more particularly, to a gas regulator for controlling flow of gas.

FIG. 4 shows a conventional gas regulator including a pressure adjusting cap 1', an upper cover 2', a screw rod 3', a pressure adjusting block 4', a spring 5', a diaphragm assembly 6', a lever 7', a base spring 8', and a body 9'. A fastener 12' is extended through a hole 11' in an upper end of the pressure adjusting cap 1' and engaged with a screw hole 31' of the screw rod 3'. The upper cap 2' includes a circular hole 21', an exhaust 22', and a plurality of longitudinal passageways 23'. The screw rod 3' includes a head 30' extending beyond the circular hole 21'. The exhaust 22' is in communication with an interior of the upper cover 2' to allow passage of air into or out of the upper cover 2'. The pressure adjusting block 4' is movably received in and limited by the passageways 23' defined in an inner periphery of the upper cover 2' such that the pressure adjusting block 4' can only move upward or downward along the passageways 23'. The screw rod 3' includes an outer thread 32', a bottom hole 33', and a limiting member 34'. The fastener 12' engages the upper end of the screw hole 31' in the head 30' with the pressure adjusting cap 1' as an integral member. The pressure adjusting block 4' is polygonal, with the pointed sections of the pressure adjusting block 4' received in and restrained by the passageways 23', avoiding rotation of the pressure adjusting block 4'. The pressure adjusting block 4' includes a central inner thread 41' threadedly engaged with the outer thread 32' of the screw rod 3'. Since the pressure adjusting block 4' is not rotatable, when the pressure adjusting cap 3' is rotated, the pressure adjusting block 4' moves upward or downward along the passageways 23' due to threading connection between the inner thread 41' and the outer thread 32'. To avoid disengagement of the pressure adjusting block 4' during the downward movement, the limiting member 34' includes a threaded shank 341' that is threadedly engaged in the bottom hole 33' in the bottom of the screw rod 3'. The spring 5' is a compression spring having an upper end abutting the pressure adjusting block 4' and a lower end abutting the diaphragm assembly 6'. Thus, when the pressure adjusting block 4' is moved upward or downward by rotating the pressure adjusting cap 1', the spring 5' presses against the diaphragm assembly 6' to different extents. The diaphragm assembly 6' includes an axle 60', a washer 61' riveted to a top of the axle 60', a pressing board 62', and a diaphragm 63' made of rubber. A flange on outer periphery of the axle 60' is in sealing contact with the diaphragm 63' due to pressing by the washer 61' and the pressing board 62'. A portion of the outer periphery of the diaphragm assembly 6' not pressed against by the pressing board 62' is sandwiched by the upper cover 2' and the body 9' for sealing purposes to avoid leakage of gas. The axle 60' includes an annular groove 601' in which the lever 7' is engaged. The lever 7' includes a slot 71', a pin hole 72', and a seal 73'. The slot 71' includes a larger section through which the axle 60' extends, such that the annular groove 601' of the axle 60' is engaged with the smaller section of the slot 71'. Thus, the lever 7' can be driven by the axle 60'. A pin 74' is extended through the pin hole 72' to fix the lever 7' to the body 9'. Thus, the seal 73' at the bottom of the lever 7' can sway to open or close a gas inlet 92' of the body 9'. The base spring 8' is a compression spring having an upper end abutting the lever 7' and a lower end abutting a limiting groove 91' of the body 9'. Thus, the base spring 8' can assist in reliable closing of the gas inlet 92' of the body 9' by the seal 73' of the lever 7'. The body 9' further includes a gas outlet 93', two opposite fixed seats 94', a base 95', a pressure reducing chamber 96', and an annular wall 97'. The gas inlet 92' and the gas outlet 93' allow gas to flow into a gas stove. Two ends of the pin 74' are fixed by the fixed seats 94'. The diaphragm 63' and the upper cover 2' are mounted to the base 95' in sequence. The annular wall 97' is processed by a machine to bend and deform inward for fixing the diaphragm 63' and the upper cover 2'. Since the diaphragm 63' and the base 95' are completely sealed, a pressure reducing chamber 96' is formed between the diaphragm 63' and the body 9'. When the gas in the pressure reducing chamber 96' flows outward due to use of the gas stove (namely, the pressure in the pressure reducing chamber 96' drops), the spring 5' pushes the diaphragm assembly 6' and the axle 60' downward. The lower end of the axle 60' actuates the lever 7' and, thus, causes the seal 73' to sway upward, which, in turn, opens the gas inlet 92' to allow the high-pressure gas to flow into the pressure reducing chamber 96'. The diaphragm assembly 6' and the axle 60' are moved upward when the pressure in the pressure reducing chamber 96' increases. The lower end of the axle 60' actuates the lever 7' and, thus, causes the seal 73' to sway downward. The amount of gas flowing through the gas inlet 92' into the gas stove is reduced under the action of the base spring 8'. By repeated movements in a relatively short period of time, the pressure of the gas outputted to the gas stove can be maintained in a certain range. In a case that the pressure of the gas flowing from the pressure reducing chamber 96' to the gas stove is not proper, the user can only rotate the pressure adjusting cap 1' to cause rotation of the screw rod 3' engaged with the pressure adjusting cap 1'. Since the pressure adjusting block 4' threadedly engaged with the screw rod 3' is not rotatable, the pressure adjusting block 4' is moved upward or downward along the passageways 23' due to threading connection between the inner thread 41' and the outer thread 32'. Thus, the diaphragm assembly 6' and the axle 60' are pressed against by the spring 5' to different extents to change the pressure of the gas flowing from the pressure reducing chamber 96' to the gas stove. However, the gas regulator of FIG. 4 can not be manually operated to shut off the gas, nor can the flow of the gas be adjusted.

FIG. 5 shows another conventional gas regulator proposed to solve the disadvantages of the conventional gas regulator of FIG. 4. Specifically, the gas regulator of FIG. 5 includes a knob 1", an upper cover 2", a return spring 3", a rotating block 4", a movable block 5", a pressure adjusting spring 6", a diaphragm assembly 7", a body 8", and an inlet tube 9". The knob 1" includes an inner tube 10", an engagement groove 11", and a protrusion 12". The upper cover 2" includes a circular tube 21", a circular hole 22", and a semi-circular, inclined slope 23" having an upper stop end 231" and a lower stop end 232". The rotating block 4" includes an engagement portion 41" engaged with the engagement groove 11" of the knob 1", a limiting block 42" for preventing disengagement of the rotating block 4" from the knob 1", an inner thread 43", a screw rod 44" having an outer thread 441" threadedly engaged with the inner thread 43", a bottom hole 45", and a protruded portion 46". The diaphragm assembly 7" includes a pressing block 70", a diaphragm 71" mounted to a top of the pressing block 70", and a pressing board 72". The body 8" includes a screw hole 81" for threadable receipt of the inlet tube 9", a gas outlet 82", a pressure reducing chamber 83" in communication with the gas outlet 82", and an annular wall 84" that can be bent to fix the body 8" and the upper cover 2". The inlet tube 9" includes a gas inlet 91" and a passageway 92" in communication with the gas inlet 91" and having an inner thread 93" threadedly engaged with a valve body 94" to which a seal ring 95" is mounted for preventing leakage of the gas. The valve body 94" includes a passage 941" in communication with the gas inlet 91" and the gas outlet 82". A compression spring 942" is mounted around a valve stem 943" received in the passage 941". The valve stem 943" includes a plug 944" for closing the passage 941". The engagement portion 41" of the rotating block 4" is engaged with the engagement groove 11" and the protrusion 12" of the knob 1" to allow joint movement. The return spring 3" is mounted around the inner tube 10" of the knob 1", with an upper end of the return spring 3" abutting an inner face of a top end of the knob 1", and with a lower end of the return spring 3" abutting top faces of the upper and lower stop ends 231" and 232" of the upper cover 2". The movable block 5" is received in the bottom hole 45", with an upper end of the movable block 5" abutting the bottom of the screw rod 3", and with a lower end of the movable block 5" abutting an upper end of the compression spring 6". A lower end of the compression spring 6" abuts the diaphragm assembly 7". The body 8" is aligned with a bottom of the upper cover 2", and the annular wall 84" of the body 8" is processed by a machine to bend and deform inward for fixing the body 8" and the upper cover 2". After fixing of the body 8" and the cover 2", the upper end of the diaphragm 7" abuts the lower end of the compression spring 6", and the upper end of the compression spring 6" abuts the lower end of the movable block 5". Since the upper end of the movable block 5" abuts the lower end of the rotating block 4" coupled to the upper cover 2" and the knob 1" and since the return spring 3" is mounted between the upper cover 2" and the knob 1", the protruded portion 46" of the rotating block 4" is located above (but not right above) the semi-circular, inclined slope 23" under the action of the return spring 3".

In use, the knob 1" is pressed and rotated to move the protruded portion 46" to a position right below the slope 23", with the upper face of the protruded portion 46" abutting the bottom face of the upper stop end 231" of the semi-circular inclined slope 23". At the same time, the rotating block 4" securely engaged with the knob 1" is moved downward due to downward movement of the knob 1", pushing the movable block 5", the pressure adjusting spring 6", and the diaphragm assembly 7" downward. Thus, the pressing block 70" of the diaphragm assembly 7" abuts the upper end of the valve stem 943". The knob 1" is further rotated. Since the upper face of the protruded portion 46" moves from the upper stop end 231" to the lower stop end 232" along the bottom face of the semi-circular, inclined slope 23", the rotating block 4" securely engaged with the knob 1" is also rotated downward to its lowest position. At the same time, the pressing block 70" causes downward movement of the valve stem 943" to its lowest position, such that the plug 944" has the largest spacing to the passage 941". The high-pressure gas from the gas inlet 91" passes through the passageway 92" and the passage 941" into the pressure reducing chamber 83" under the maximum flow and then exits the gas outlet 82". In a case that the knob 1" is turned to a position such that the upper face of the protruded portion 46" abuts the bottom face of the semi-circular inclined slope 23" in a location between the upper and lower stop ends 231" and 232", the spacing between the plug 944" and the passage 941" is half of the maximum spacing. Thus, the high-pressure gas from the gas inlet 91" passes through the passageway 92" and the passage 941" into the pressure reducing chamber 83" under the half flow. On the other hand, if the knob 1" is rotated in a reverse direction such that the protruded portion 46" is located above (but not right above) the semi-circular, inclined slope 23", due to provision of the return spring 3" between the upper cover 2" and the knob 1", the rotating block 5" is moved upward without pushing the pressing block 70". The valve stem 943" moves such that the plug 944" closes the passage 941" to prevent the gas from entering the pressure reducing chamber 83". Since diameter of the passage 941" must receive the valve stem 943" such that a large gap exists between an inner periphery of the passage 941" and the valve stem 943", when the pressing block 70" presses against the valve stem 943", the valve stem 943" will wobble and decline in a direction indicated by an arrow A in FIG. 5, and the movement of the valve stem 943" is inaccurate, adversely affecting control of the flow of the gas. Thus, a need exists for accurately controlling the flow of the gas and accurately closing and opening the passage to increase the efficiency.

BRIEF SUMMARY OF THE INVENTION

The primary objective of the present invention is to provide a manually operable gas regulator to accurately control the flow of the gas and accurately close and open the passage to increase the efficiency.

A gas regulator according to the present invention includes a knob having an inner tube. An engagement groove is formed in an inner periphery of the inner tube. A protrusion is formed on a mediate section of the engagement groove. An upper cover includes a circular tube having two open ends. A circular hole is formed in an upper end of the circular tube. A semi-circular, inclined slope is formed on an inner periphery of the circular tube and has an upper stop end and a lower stop end. A return spring has two ends respectively abutting the knob and the upper cover. A hollow rotating block includes an engagement portion having a width equal to a width of the engagement groove of the knob. The engagement portion is engaged with the engagement groove of the knob. The rotating block further includes a limiting block preventing the rotating block from disengaging from the knob. The rotating block further includes an inner thread. A screw rod has an outer thread threadedly engaged with the inner thread of the rotating block. The rotating block further includes a bottom hole and a protruded portion located above the semi-circular inclined slope.

The gas regulator further includes a movable block received in the bottom hole of the rotating block. The movable block includes an upper end abutting a bottom of the screw rod. A pressure adjusting spring has an upper end abutting a lower end of the movable block. A diaphragm assembly abuts a lower end of the pressure adjusting spring. The diaphragm assembly includes an axle having a slot. The diaphragm assembly further includes a diaphragm mounted to a top end of the axle and made of rubber. The diaphragm assembly further includes a pressing board that presses against the diaphragm to keep the axle in sealing contact with the diaphragm. A body includes a fixed seat, a supporting seat, a screw hole, an inlet passage, a gas outlet, an inlet tube, a pressure reducing chamber, and an annular wall. A portion of an outer periphery of the diaphragm not pressed against by the pressing board is sandwiched and sealed between the upper cover and the body. The pressure reducing chamber is formed between the diaphragm and an interior of the body. The inlet tube is connected to the screw hole and has a gas inlet. The inlet tube further includes a passage in communication with the gas inlet. The inlet passage has an input end in communication with the passage of the inlet tube. The inlet passage has an output end in communication with the gas outlet via the pressure reducing chamber.

The gas regulator further includes a lever having a pin hole. A pin extends through the pin hole of the lever to pivotably mount the lever to the supporting seat of the body. The lever includes a ball-shaped engagement portion formed on a side of the pin hole. A plug is engaged with the engagement portion of the lever to move therewith. The plug is movable between an open position not closing the output end of the inlet passage and a closing position closing the output end of the inlet passage. The lever includes a section opposite to the engagement portion. The section of the lever extends through the slot of the axle and is engaged with the axle to move therewith. An auxiliary return spring is mounted around the axle below the lever. The auxiliary return spring has a lower end abutting the fixed seat of the body.

The present invention will become clearer in light of the following detailed description of illustrative embodiments of this invention described in connection with the drawings.

DESCRIPTION OF THE DRAWINGS

FIG. 1 shows a cross sectional view of a manually operable gas regulator according to the present invention.

FIG. 2 shows a perspective view of an axle of the gas regulator of FIG. 1.

DETAILED DESCRIPTION OF THE INVENTION

Figure 3:
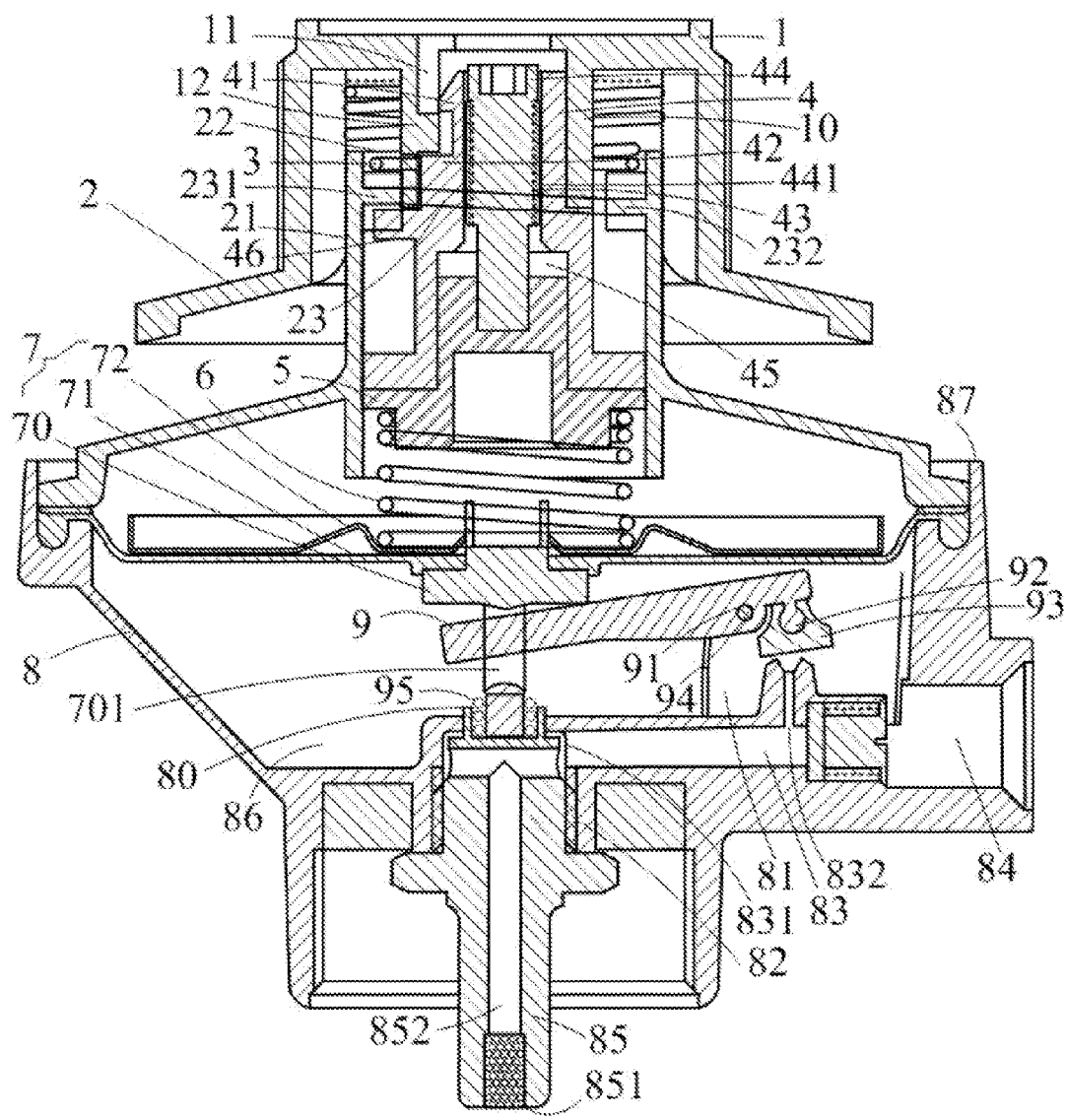
FIG. 3 shows a view similar to FIG. 1, wherein a plug of the gas regulator is in an open position not blocking an output end of an inlet passage.
Figure 4:
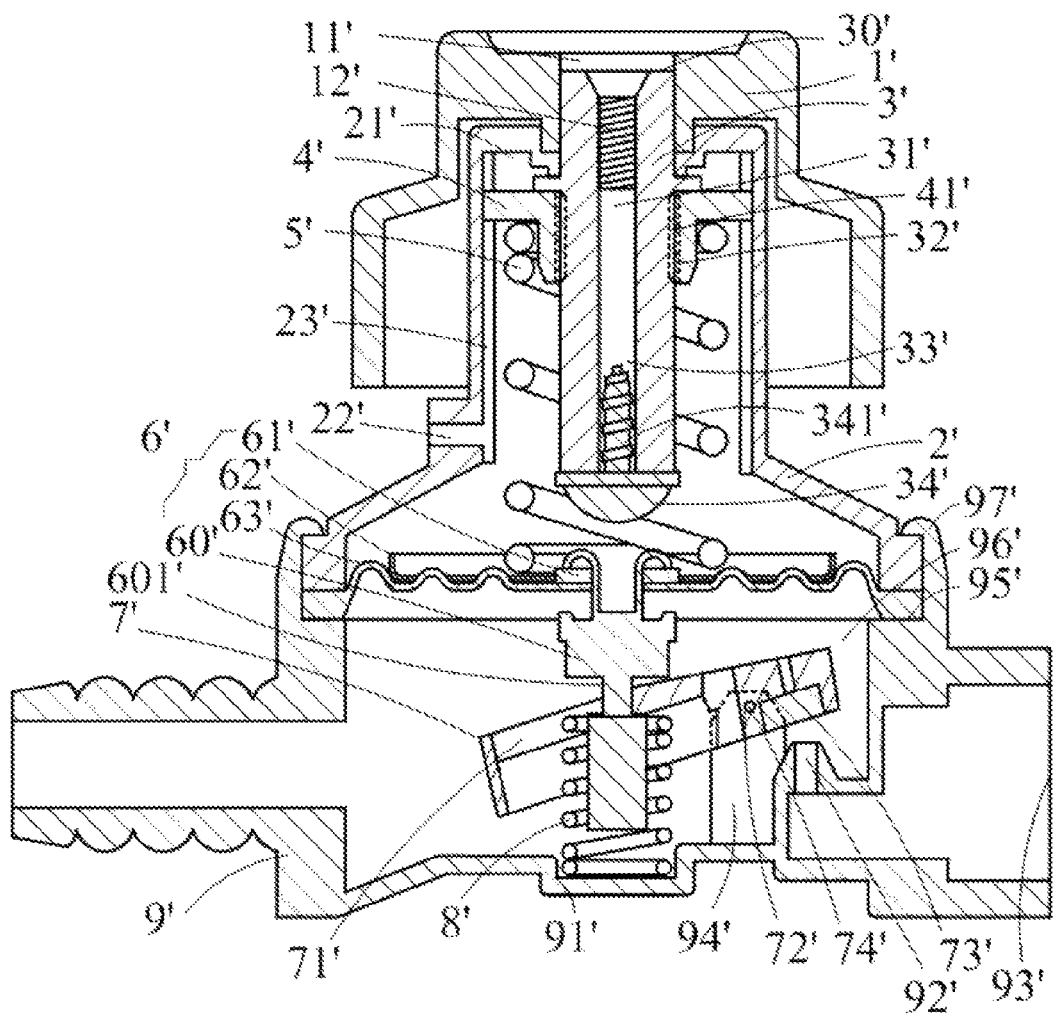
FIG. 4 shows a cross sectional view of a conventional gas regulator.
Figure 5:
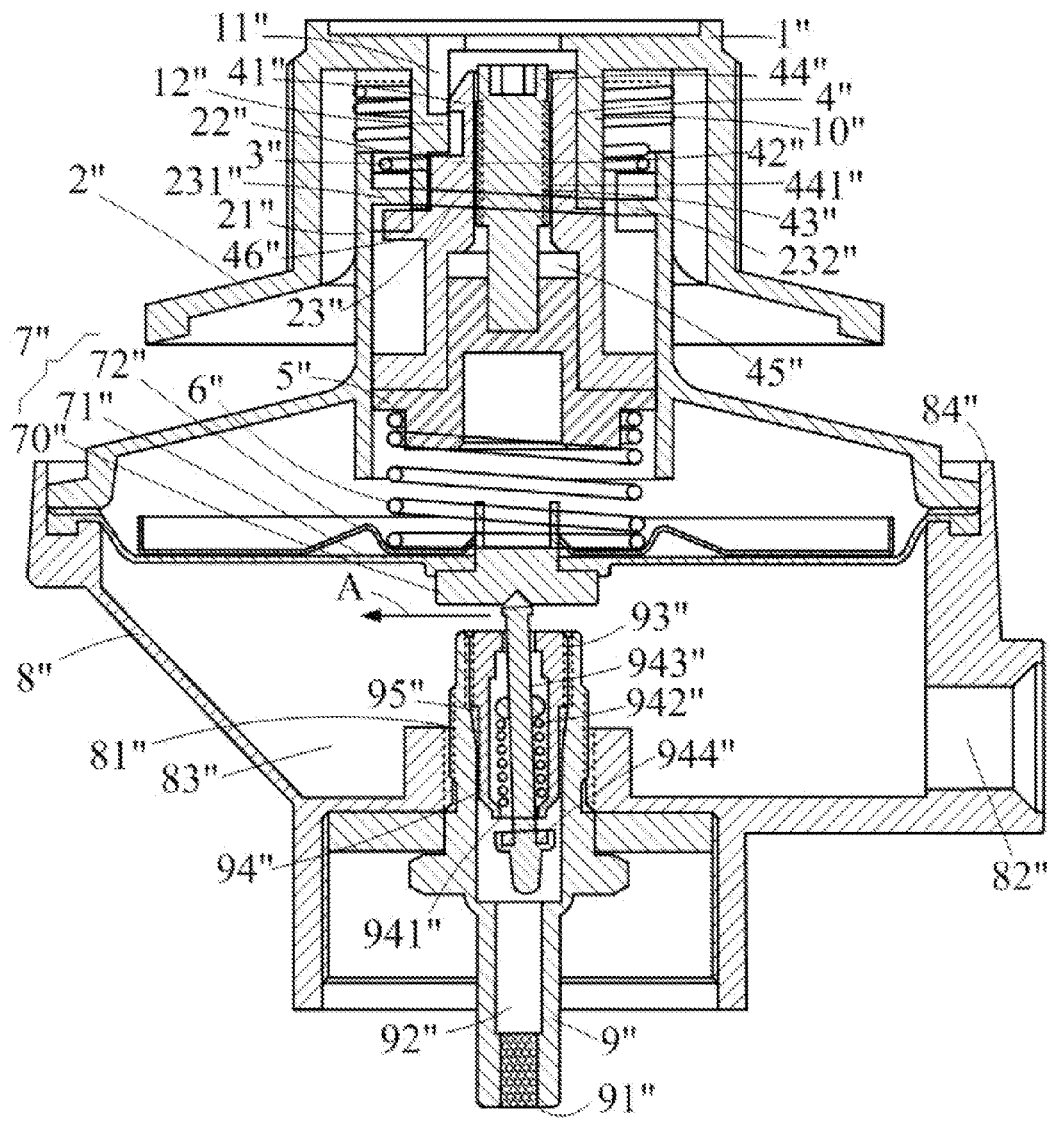
FIG. 5 shows a cross sectional view of another conventional gas regulator.

With reference to FIGS. 1-3, a manually operable gas regulator according to the present invention includes a knob 1 having an inner tube 10. An engagement groove 11 is formed in an inner periphery of the inner tube 10. A protrusion 12 is formed on a mediate section of the engagement groove 11. An upper cover 2 includes a circular tube 21 having two open ends. A circular hole 22 is formed in an upper end of the circular tube 21. A semi-circular, inclined slope 23 is formed on an inner periphery of the circular tube 21 and has an upper stop end 231 and a lower stop end 232. A return spring 3 has two ends respectively abutting the knob 1 and the upper cover 2. Thus, the knob 1 can be returned to its initial position by the return spring 3 when external force acting on the knob 1 vanishes.

A hollow rotating block 4 includes an engagement portion 41 having a width equal to a width of the engagement groove 11 of the knob 1. The engagement portion 41 is engaged with the engagement groove 11 of the knob 1. The rotating block 4 further includes a limiting block 42 preventing the rotating block 4 from disengaging from the knob 1. The rotating block 4 further includes an inner thread 43. A screw rod 44 has an outer thread 441 threadedly engaged with the inner thread 43 of the rotating block 4. The rotating block 4 further includes a bottom hole 45 and a protruded portion 46 located above the semi-circular inclined slope 23. A movable block 5 is received in the bottom hole 45 of the rotating block 4. The movable block 5 includes an upper end abutting a bottom of the screw rod 44. A pressure adjusting spring 6 has an upper end abutting a lower end of the movable block 5.

A diaphragm assembly 7 abuts a lower end of the pressure adjusting spring 6. The diaphragm assembly 7 includes an axle 70 having a slot 701. The diaphragm assembly 7 further includes a diaphragm 71 mounted to a top end of the axle 70 and made of rubber. The diaphragm assembly 7 further includes a pressing board 72. The pressing board 72 presses against the diaphragm 71 to keep the axle 70 in sealing contact with the diaphragm 71.

A body 8 includes a fixed seat 80, a supporting seat 81, a screw hole 82, an inlet passage 83, a gas outlet 84, an inlet tube 85, a pressure reducing chamber 86, and an annular wall 87. A portion of an outer periphery of the diaphragm 71 not pressed against by the pressing board 72 is sandwiched and sealed between the upper cover 2 and the body 8, preventing leakage of gas. The pressure reducing chamber 86 is formed between the diaphragm 71 and an interior of the body 8. The fixed seat 80 and the supporting seat 81 are located in appropriate locations in the interior of the body 8. The inlet tube 85 is connected to the screw hole 82 by threading connection and has a gas inlet 851. The inlet tube 85 further includes a passage 852 in communication with the gas inlet 851. The inlet passage 83 has an input end 831 in communication with the passage 852 of the inlet tube 85. The inlet passage 83 has an output end 832 in communication with the gas outlet 84 via the pressure reducing chamber 86.

A lever 9 includes a pin hole 91. A pin 94 extends through the pin hole 91 of the lever 9 to pivotably mount the lever 9 to the supporting seat 81 of the body 8. The lever 9 includes a ball-shaped engagement portion 92 formed on a side of the pin hole 91. A plug 93 is engaged with the engagement portion 92 of the lever 9 to move therewith. The plug 93 is movable between an open position not closing the output end 832 of the inlet passage 83 and a closing position closing the output end 832 of the inlet passage 83. The lever 9 includes a section opposite to the engagement portion 92. The section of the lever 9 extends through the slot 701 of the axle 70 and is engaged with the axle 70 to move therewith. An auxiliary return spring 95 is mounted around the axle 70 below the lever 9. The auxiliary return spring 95 has a lower end abutting the fixed seat 80 of the body 8. Thus, when the external force vanishes, the auxiliary return spring 95 moves the axle 70 upward so that the plug 93 can close the output end 832 of the inlet passage 83.

In assembly, the return spring 3 is mounted around the inner tube 10 of the knob 1, with the upper end of the spring 3 abutting an inner face of the top end of the knob 1. Then, the circular tube 21 of the upper cover 2 is mounted to the bottom of the knob 1, such that the lower end of the spring 3 abuts the top faces of the upper and lower stop ends 231 and 232 of the upper cover 2. Next, the engagement portion 41 of the rotating block 4 with the screw rod 44 coupled thereto is inserted from the bottom end of the upper cover 2 and is moved upward through the bottom end of the engagement groove 11 of the knob 1 and is forcibly passed through the protrusion 12 to make the bottom of the engagement portion 41 engage with the top face of the protrusion 12 and to make the bottom of the protrusion 12 engage with the top face of the limiting block 42. Thus, the upper cover 2 is coupled to the knob 1 by the rotating block 4, allowing joint rotational movement and joint upward/downward movement of the rotating block 1 and the rotating block 4 without the risk of disengagement. Then, the movable block 5 is placed into the bottom hole 45, with the lower end of the movable block 5 abutting the upper end of the pressure adjusting spring 6, with the lower end of the pressure adjusting spring 6 abutting the diaphragm assembly 7. Next, the body 8 with the inlet tube 85 coupled thereto is aligned with the bottom of the upper cover 2, and the annular wall 87 of the body 8 is processed by a machine to bend and deform inward so as to fix the body 8 and the upper cover 2. After fixing the body 8 and the upper cover 2, the upper end of the diaphragm assembly 7 abuts the lower end of the pressure adjusting spring 6. The upper end of the pressure adjusting spring 6 abuts the lower end of the movable block 5. The upper end of the movable block 5 abuts the lower end of the rotating block 4 that is coupled to the upper cover 2 and the knob 1. Due to provision of the return spring 3 between the upper cover 2 and the knob 1, the protruded portion 46 of the rotating block 4 is located above (but not right above) the semi-circular inclined slope 23.

In use, the knob 1 is pressed and rotated to move the protruded portion 46 to be rotated to a position right below the semi-circular inclined slope 23, with the upper face of the protruded portion 46 abutting the lower face of the upper stop end 231 of the semi-circular inclined slope 23. At the same time, the rotating block 4 is moved downward due to the downward movement of the knob 1 that is coupled to the rotating block 4 as an integral member, which, in turn, causes downward movement of the movable block 5, the pressure adjusting spring 6, and the diaphragm assembly 7. Thus, the axle 70 of the diaphragm assembly 7 is moved downward. The knob 1 is further rotated, and the upper face of the protruded portion 46 moves from the upper stop end 231 to the lower stop end 232 along the lower face of the semi-circular inclined slope 23. The rotating block 4 is rotated and moved downward to its lowest position, and the axle 70 is also moved to its lowest position. Due to downward movement of the axle 70, the lever 9 pivots about the pin 94, such that the plug 93 moves in a direction opposite to the axle 70. The plug 93 has a maximum spacing to the output end 832 of the inlet passage 83. The high-pressure gas from the gas inlet 851 flows through the passage 852, the input end 831, and the pressure reducing chamber 86 under the maximum flow and then exits the gas outlet 84, as shown in FIG. 3.

In a case that the knob 1 is rotated to a position in which the upper face of the protruded portion 46 abuts the lower face of the semi-circular inclined slope 23 in a location between the upper and lower stop ends 231 and 232, the spacing between the plug 93 and the output end 832 of the inlet passage 83 is half of the maximum spacing. The high-pressure gas from the gas inlet 851 flows through the passage 852, the input end 831, and the pressure reducing chamber 86 under a half of the maximum flow and then exits the gas outlet 84.

If the knob 1 is rotated in a reverse direction such that the protruded portion 46 of the rotating block 4 is located above (but not right above) the semi-circular inclined slope 23, due to provision of the return spring 3 between the upper cover 2 and the knob 1, the rotating block 5 is moved upward without pushing the axle 70. The axle 70 is moved upward to its uppermost position under the action of the auxiliary return spring 95. At the same time, the plug 93 on the lever 9 moves downward to close the output end 832 of the inlet passage 83 due to upward movement of the axle 70, preventing the gas from entering the pressure reducing chamber 86, as shown in FIG. 1.

In view of the foregoing, due to provision of the lever 9 pivotably mounted to the supporting seat 81 of the body 1, the plug 93 can be moved in a direction opposite to the axle 70 to accurately control the flow of the gas and to accurately close or open the output end 832 of the inlet passage 83.

Although specific embodiments have been illustrated and described, numerous modifications and variations are still possible without departing from the essence of the invention. The scope of the invention is limited by the accompanying claims.

The invention claimed is:
1. A gas regulator comprising:
a knob (1) including an inner tube (10) having an inner periphery, with an engagement groove (11) formed in the inner periphery of the inner tube (10), with a protrusion (12) formed on a mediate section of the engagement groove (11);
an upper cover (2) including a circular tube (21) having two open ends, with a circular hole (22) formed in an upper end of the circular tube (21), with a semi-circular, inclined slope (23) formed on an inner periphery of the circular tube (21) and having an upper stop end (231) and a lower stop end (232);
a return spring (3) having two ends respectively abutting the knob (1) and the upper cover (2);
a hollow rotating block (4) including an engagement portion (41) having a width equal to a width of the engagement groove (11) of the knob (1), with the engagement portion (41) engaged with the engagement groove (11) of the knob (1), with the rotating block (4) further including a limiting block (42) preventing the rotating block (4) from disengaging from the knob (1), with the rotating block (4) further including an inner thread (43), with a screw rod (44) having an outer thread (441) threadedly engaged with the inner thread (43) of the rotating block (4), with the rotating block (4) further including a bottom hole (45) and a protruded portion (46) located above the semi-circular inclined slope (23);
a movable block (5) received in the bottom hole (45) of the rotating block (4), with the movable block (5) including an upper end abutting a bottom of the screw rod (44), with the movable block (5) further including a lower end;
a pressure adjusting spring (6) having an upper end abutting the lower end of the movable block (5), with the pressure adjusting spring (6) further including a lower end;
a diaphragm assembly (7) abutting the lower end of the pressure adjusting spring (6), with the diaphragm assembly (7) including an axle (70) having a slot (701), with the diaphragm assembly (7) further including a diaphragm (71) mounted to a top end of the axle (70) and made of rubber, with the diaphragm assembly (7) further including a pressing board (72), with the pressing board (72) pressing against the diaphragm (71) to keep the axle (70) in sealing contact with the diaphragm (71);
a body (8) including a fixed seat (80), a supporting seat (81), a screw hole (82), an inlet passage (83), a gas outlet (84), an inlet tube (85), a pressure reducing chamber (86), and an annular wall (87), with a portion of an outer periphery of the diaphragm (71) not pressed against by the pressing board (72) being sandwiched and sealed between the upper cover (2) and the body (8), with the pressure reducing chamber (86) formed between the diaphragm (71) and an interior of the body (8), with the inlet tube (85) connected to the screw hole (82) and having a gas inlet (851), with the inlet tube (85) further including a passage (852) in communication with the gas inlet (851), with the inlet passage (83) having an input end (831) in communication with the passage (852) of the inlet tube (85), with the inlet passage (83) having an output end (832) in communication with the gas outlet (84) via the pressure reducing chamber (86); and
a lever (9) including a pin hole (91), with a pin (94) extending through the pin hole (91) of the lever (9) to pivotably mount the lever (9) to the supporting seat (81) of the body (8), with the lever (9) including a ball-shaped engagement portion (92) formed on a side of the pin hole (91), with a plug (93) engaged with the engagement portion (92) of the lever (9) to move therewith, with the plug (93) movable between an open position not closing the output end (832) of the inlet passage (83) and a closing position closing the output end (832) of the inlet passage (83), with the lever (9) including a section opposite to the engagement portion (92), with the section of the lever (9) extending through the slot (701) of the axle (70) and engaged with the axle (70) to move therewith, with an auxiliary return spring (95) mounted around the axle (70) below the lever (9), with the auxiliary return spring (95) having a lower end abutting the fixed seat (80) of the body (8).

\* \* \* \* \*